(12) United States Patent
Chen et al.

(10) Patent No.: US 12,360,314 B2
(45) Date of Patent: Jul. 15, 2025

(54) PHOTONIC SEMICONDUCTOR-ON-INSULATOR (SOI) SUBSTRATE AND METHOD FOR FORMING THE PHOTONIC SOI SUBSTRATE

(71) Applicant: Taiwan Semiconductor Manufacturing Company, Ltd., Hsinchu (TW)

(72) Inventors: Eugene I-Chun Chen, Taipei (TW); Kuan-Liang Liu, Pingtung (TW); De-Yang Chiou, Hsinchu (TW); Yung-Lung Lin, Taichung (TW); Chia-Shiung Tsai, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 389 days.

(21) Appl. No.: 18/149,260

(22) Filed: Jan. 3, 2023

(65) Prior Publication Data
US 2024/0094464 A1    Mar. 21, 2024

Related U.S. Application Data

(60) Provisional application No. 63/407,767, filed on Sep. 19, 2022.

(51) Int. Cl.
*G02B 6/122* (2006.01)
*G02B 6/12* (2006.01)
(Continued)

(52) U.S. Cl.
CPC ............ *G02B 6/122* (2013.01); *G02B 6/131* (2013.01); *G02B 6/136* (2013.01); *G02B 2006/12197* (2013.01)

(58) Field of Classification Search
CPC ........ G02B 6/122; G02B 6/131; G02B 6/136; G02B 2006/12197; G02B 2006/12061; G02B 2006/12097; G02B 6/132
See application file for complete search history.

(56) References Cited

U.S. PATENT DOCUMENTS

| | | | | |
|---|---|---|---|---|
| 10,162,110 | B2 * | 12/2018 | Usami | G02B 6/12002 |
| 11,855,159 | B2 * | 12/2023 | Wu | H01L 21/02238 |
| 12,189,181 | B2 * | 1/2025 | Yu | G02B 6/13 |

OTHER PUBLICATIONS

Basu et al. "Infrared Radiative Properties of Heavily Doped Silicon at Room Temperature" Journal of Heat Transfer, vol. 132, published Feb. 2010.

(Continued)

*Primary Examiner* — John Bedtelyon
(74) *Attorney, Agent, or Firm* — Eschweiler & Potashnik, LLC

(57) ABSTRACT

A semiconductor-on-insulator (SOI) structure and a method for forming the SOI structure. The method includes forming a first dielectric layer on a first semiconductor layer. A second semiconductor layer is formed over an etch stop layer. A cleaning solution is provided to a first surface of the first dielectric layer. The first dielectric layer is bonded under the second semiconductor layer in an environment having a substantially low pressure. An index guiding layer may be formed over the second semiconductor layer. A third semiconductor layer is formed over the second semiconductor layer. A distance between a top of the third semiconductor layer and a bottom of the second semiconductor layer varies between a maximum distance and a minimum distance. A planarization process is performed on the third semiconductor layer to reduce the maximum distance.

20 Claims, 12 Drawing Sheets

(51) Int. Cl.
 *G02B 6/13* (2006.01)
 *G02B 6/136* (2006.01)

(56) References Cited

OTHER PUBLICATIONS

Xia, Guangrui. "Silicon-Germanium Interdiffusion and Its Impacts on Enhanced Mobility MOSFETs" Massachusetts Institute of Technology, published Apr. 2006.

* cited by examiner

ND METHOD FOR FORMING
PHOTONIC SEMICONDUCTOR-ON-INSULATOR (SOI) SUBSTRATE AND METHOD FOR FORMING THE PHOTONIC SOI SUBSTRATE

REFERENCED TO RELATED APPLICATION

This Application claims the benefit of U.S. Provisional Application No. 63/407,767, filed on Sep. 19, 2022, the contents of which are hereby incorporated by reference in their entirety.

BACKGROUND

Semiconductor-on-insulator (SOI) substrates are used in the fabrication of semiconductor devices. For example, many modern optical devices are formed using SOI substrates. Some optical devices include semiconductor waveguides. Semiconductor waveguides are used to confine and guide light from a first point on a photonic integrated circuit (PIC) to a second point on the PIC with minimal attenuation. In some processes, semiconductor waveguides are formed from a device layer of an SOI substrate.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
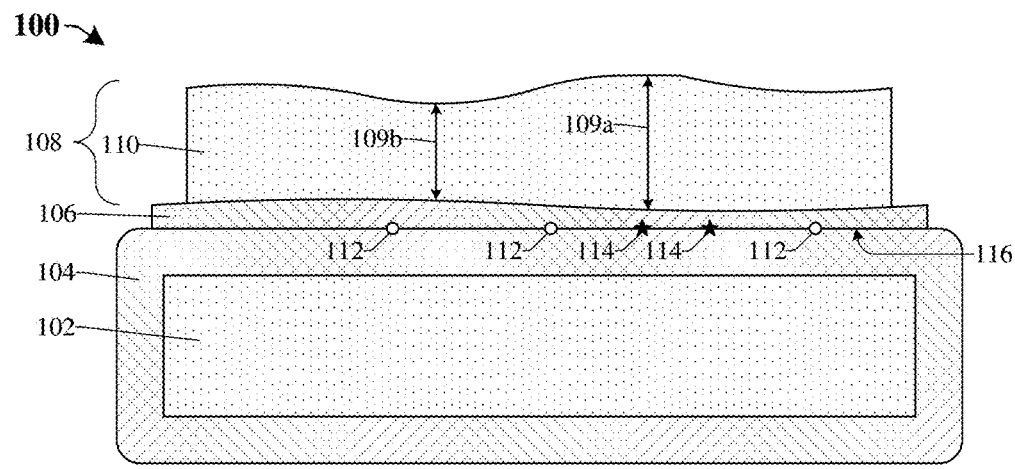
FIG. 1 illustrates a cross-sectional view of some embodiments of a semiconductor-on-insulator (SOI) substrate comprising a first dielectric layer over a semiconductor base layer, a second dielectric layer over the first dielectric layer, and a semiconductor device structure over the second dielectric layer.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some semiconductor photonic devices (e.g., semiconductor optical waveguides or the like) are formed using SOI substrates. An SOI substrate includes a semiconductor base layer, a first dielectric layer over the semiconductor base layer, an optional second dielectric layer over the first dielectric layer, and a semiconductor device layer over the dielectric layer. The dielectric layer and the semiconductor device layer may have substantially large thicknesses (e.g., greater than 0.4 micrometers and greater than 200 nanometers, respectively) in some photonic SOI substrates to operate effectively.

Photonic SOI substrates may be fabricated using a variety of processes. For example, a photonic SOI substrate may be formed from a carrier wafer and a device wafer. Forming the carrier wafer includes forming a first dielectric layer on a semiconductor base layer. Forming the device wafer includes forming an initial semiconductor device layer (e.g., a first semiconductor device layer) over an etch stop layer and forming a second dielectric layer over the initial semiconductor device layer. The carrier wafer and the device wafer are bonded together along the first and second dielectric layers to form the SOI substrate. In some cases where the initial semiconductor device layer is not thick enough (e.g., not greater than 200 nanometers) to meet the requirements for a photonic SOI substrate, an additional semiconductor device layer (e.g., a second semiconductor device layer) may be formed over the initial semiconductor device layer (e.g., the first semiconductor device layer) after the bonding to increase the total thickness of the semiconductor device layers to a suitable value.

A challenge with some of these methods for forming photonic SOI substrates is that defects may be formed along the bonding interface between the first and second dielectric layers during the bonding. For example, cavities (e.g., bubbles) may be formed along the bonding interface between the first and second dielectric layers due to gas being trapped between the layers during the bonding. Further, undesired particles may exist along the bonding interface after the bonding. These defects may render the photonic SOI substrate defective. Thus, a yield of SOI substrates suitable for photonic devices may be reduced.

Another challenge with these methods is that forming the additional semiconductor device layer over the initial semiconductor device layer after the bonding may result in the semiconductor device layers having an increased total thickness variation (TTV) (e.g., a difference between a maximum thickness of the semiconductor device layers and a minimum thickness of the semiconductor device layers). An increased TTV can render the SOI unsuitable for photonic devices. For example, an increased TTV can negatively affect the operation and/or performance of an optical waveguide formed from the SOI substrate. Thus, SOI substrates having increased TTV may be rendered operationally defective. Consequently, a yield of SOI substrates suitable for photonic devices may be further reduced.

Various embodiments of the present disclosure are related to a method for forming an SOI substrate having reduced bonding interface defects and improved TTV to improve a yield of suitable SOI substrates. The method includes forming a first dielectric layer over a semiconductor base layer and forming a second dielectric layer over a first semiconductor device layer. A cleaning solution is provided to a bonding surface of the first dielectric layer and a bonding surface of the second dielectric layer. The bonding surfaces of the first and second dielectric layers are then bonded together in an environment having a substantially low pressure. A second semiconductor device layer is formed over the first semiconductor device layer after the bonding. A planarization process is performed on the second semiconductor device layer.

By providing the cleaning solution to the bonding surfaces of the first and second dielectric layers before bonding the first dielectric layer and the second dielectric layer together, particles may be removed from the bonding surfaces before the bonding. Thus, particle defects along the bonding interface can be reduced. Further, by bonding the first and second dielectric layers in the low-pressure environment, a likelihood of gas being trapped along the bonding interface during the bonding can be reduced. Thus, cavity defects along the bonding interface can be reduced. Furthermore, by planarizing the second semiconductor device layer after forming the second semiconductor device layer over the first semiconductor device layer, a TTV of the semiconductor device layers can be reduced. As a result, a yield of suitable SOI substrates can be improved.

FIG. 1 illustrates a cross-sectional view 100 of some embodiments of a semiconductor-on-insulator (SOI) substrate comprising a first dielectric layer 104 over a semiconductor base layer 102, a second dielectric layer 106 over the first dielectric layer 104, and a semiconductor device structure 108 over the second dielectric layer 106.

Figure 3:
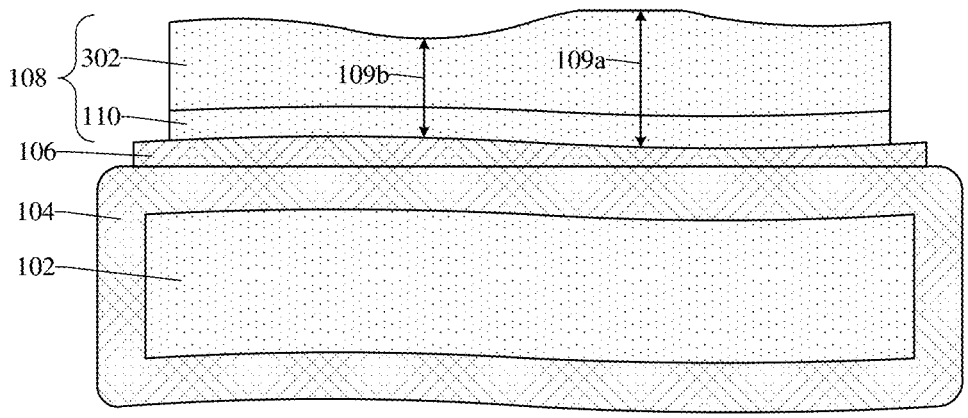
FIG. 3 illustrates a cross-sectional view of some embodiments of the SOI substrate of FIG. 1 in which the semiconductor device structure further includes a second semiconductor device layer.

The first dielectric layer 104 is on a top surface of the semiconductor base layer 102. In some embodiments, the first dielectric layer 104 surrounds the semiconductor base layer 102 on all sides of the semiconductor base layer 102. The second dielectric layer 106 is on a top surface of the first dielectric layer 104. In some embodiments, a total thickness of the first dielectric layer 104 and the second dielectric layer 106 is greater than 0.5 micrometers, greater than 1 micrometer, or some other value. In some embodiments, a thickness of the second dielectric layer 106 varies along the second dielectric layer 106. In some embodiments, the semiconductor base layer 102 and the first dielectric layer 104 also have thicknesses which vary across said layers (e.g., as illustrated in FIG. 3).

The semiconductor device structure 108 is on a top surface of the second dielectric layer 106. The semiconductor device structure 108 includes a first semiconductor device layer 110. A thickness of the semiconductor device structure 108 (e.g., a distance between a top surface of the semiconductor device structure 108 and a bottom surface of the semiconductor device structure 108) varies along the semiconductor device structure 108. For example, the thickness of the semiconductor device structure 108 varies between a maximum thickness 109a (e.g., a maximum distance) and a minimum thickness 109b (e.g., a minimum distance), different than the maximum thickness 109a.

Figure 23:
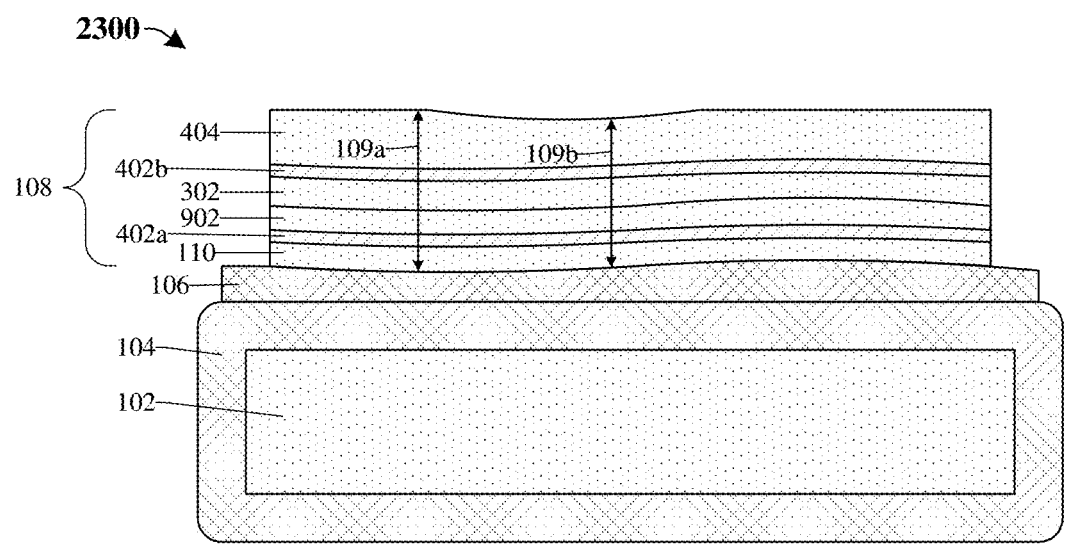

During fabrication of the SOI substrate, a planarization process is performed on a top surface of the semiconductor device structure 108 after the semiconductor device structure 108 is formed over the dielectric layers 104, 106 (e.g., as illustrated in FIG. 23). The planarization process reduces a total thickness variation (TTV) (e.g., a difference between the maximum thickness 109a and the minimum thickness 109b) of the semiconductor device structure 108. As a result, the TTV of the semiconductor device structure 108 is substantially small. For example, the difference between the maximum thickness 109a and the minimum thickness 109b is less than 5% of the maximum thickness 109a, less than 3% of the maximum thickness 109a, or some other suitable value. By reducing the TTV of the semiconductor device structure 108, the SOI substrate may be more suitable for optical devices. For example, reducing the TTV of the semiconductor device structure 108 may reduce a loss of optical radiation (e.g., light loss) along an optical device (e.g., semiconductor waveguide 202 of FIGS. 2A, 2B) formed from the semiconductor device structure 108. Thus, a performance of the optical device may be improved.

Further, the first dielectric layer 104 and the second dielectric layer 106 are bonded together during the fabrication of the SOI substrate. In some embodiments, one or more cavities 112 are formed directly between the first dielectric layer 104 and the second dielectric layer 106 during the bonding. For example, the cavities 112 may exist along a bonding interface 116 between the first dielectric layer 104 and the second dielectric layer 106 due to gas(es) being trapped along the bonding interface 116 during the bonding. The cavities 112 may render the SOI substrate defective. However, by bonding the first dielectric layer 104 and the second dielectric layer 106 in a low-pressure environment (e.g., in a bonding chamber at a substantially low pressure), a likelihood of gas(es) being trapped along the bonding interface 116 during the bonding can be reduced. For example, reducing the pressure in the bonding environment (e.g., the bonding chamber) reduces gas(es) in the bonding environment. Thus, a likelihood of cavities 112 forming along the bonding interface 116 during the bonding can be reduced. As a result, a yield of SOI substrates suitable for optical devices can be improved.

In some embodiments, one or more particles 114 exist directly between the first dielectric layer 104 and the second dielectric layer 106 along the interface 116. The particles 114 can form defects along the interface 116 which may render the SOI substrate defective. However, by performing a cleaning process on the first dielectric layer 104 and the second dielectric layer 106 before the dielectric layers 104, 106 are bonded, a likelihood of particles 114 existing along the boding interface 116 can be reduced. For example, the cleaning process includes providing a cleaning solution to the bonding surfaces of the dielectric layers 104, 106. The cleaning solution may remove the particles 114 from the bonding surfaces of the dielectric layers 104, 106 before the bonding. Thus, a likelihood of particle defects existing along the boding interface 116 can be reduced. As a result, a yield of SOI substrates suitable for optical devices can be further improved.

In some embodiments, the semiconductor base layer 102 and the first semiconductor device layer 110 may, for example, comprise silicon or some other suitable material. In some embodiments, the first dielectric layer 104 and the second dielectric layer 106 may, for example, comprise silicon dioxide or some other suitable material.

In some embodiments, the first dielectric layer 104 and the second dielectric layer 106 may be referred to together as a buried dielectric layer. In some embodiments, a width of the second dielectric layer 106 is less than a width of the first dielectric layer 104 and greater than a width of the semiconductor device structure 108. In some other embodiments, the width of second dielectric layer 106 is approximately equal to the width of semiconductor device structure 108.

Figure 2A:
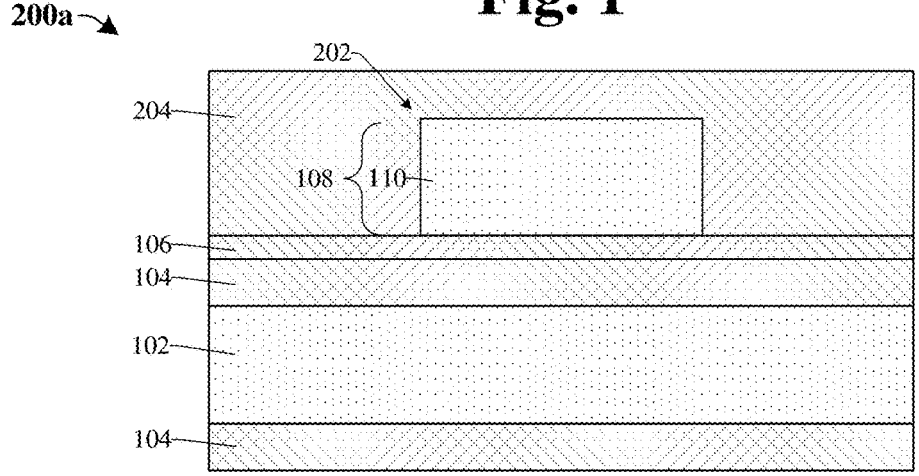
FIG. 2A illustrates a cross-sectional view of some embodiments of an optical structure formed from the SOI substrate of FIG. 1.
Figure 2B:
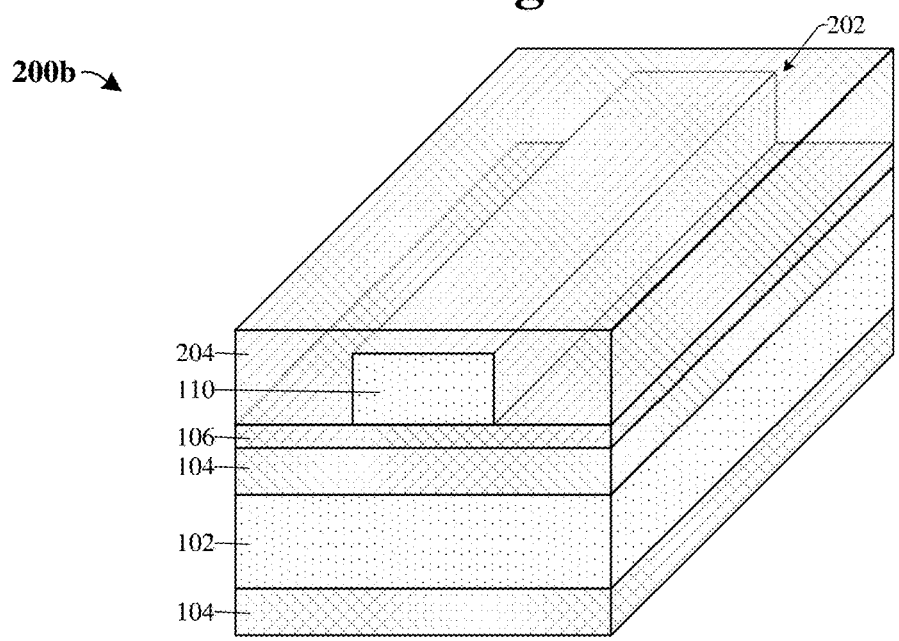
FIG. 2B illustrates a three-dimensional view of some embodiments of the optical structure of FIG. 2A.

FIG. 2A illustrates a cross-sectional view 200a of some embodiments of an optical structure formed from the SOI substrate of FIG. 1. FIG. 2B illustrates a three-dimensional view 200b of some embodiments of the optical structure of FIG. 2A. The structure is drawn as a straight device, but some embodiments may include curves, bends or crossings.

For example, the optical structure includes a semiconductor waveguide 202. The semiconductor waveguide 202 is formed from the semiconductor device structure 108 (e.g., the first semiconductor device layer 110 of the semiconductor device structure 108). Thus, the semiconductor waveguide 202 is disposed over the second dielectric layer 106, the first dielectric layer 104, and the semiconductor base layer 102. In some embodiments, forming the semiconductor waveguide 202 from the SOI substrate of FIG. 1 comprises etching the semiconductor device structure 108. In some embodiments, a cladding layer 204 is subsequently deposited over the semiconductor waveguide 202.

Although layers 102, 104, 106, 108 are illustrated as having uniform thicknesses in FIG. 2A and FIG. 2B, it will be appreciated said layers may have thicknesses which vary across said layers (e.g., as illustrated in FIG. 1).

FIG. 3 illustrates a cross-sectional view 300 of some embodiments of the SOI substrate of FIG. 1 in which the semiconductor device structure 108 further includes a second semiconductor device layer 302.

The second semiconductor device layer 302 is over the first semiconductor device layer 110. The second semiconductor device layer 302 is included in the semiconductor device structure 108 to increase a total thickness of the semiconductor device structure 108. For example, when forming the SOI substrate, if the first semiconductor device layer 110 is not thick enough (e.g., less than 200 nanometers, less than 300 nanometers, or some other suitable value) after the dielectric layers 104, 106 are bonded, the second semiconductor device layer 302 can be formed over the first semiconductor device layer 110 to increase the total thickness of the semiconductor device structure 108. Thus, the thickness of the semiconductor device structure 108 can be tuned to an optimal thickness for optical devices (e.g., semiconductor waveguides or some other suitable optical devices) that may be subsequently formed from the SOI substrate. In some embodiments, the thickness of the semiconductor device structure 108 is greater than 300 nanometers or some other suitable value. In some embodiments, the thickness of the first semiconductor device layer 110 is less than the thickness of the second semiconductor device layer 302. In some other embodiments, the thickness of the first semiconductor device layer 110 is greater than the thickness of the second semiconductor device layer 302.

After the second semiconductor device layer 302 is formed over the first semiconductor device layer 110, a top surface of the second semiconductor device layer 302 is planarized to reduce the TTV of the semiconductor device structure 108 (e.g., the TTV from the bottom of the first semiconductor device layer 110 to the top of the second semiconductor device layer 302) to improve the suitability of the semiconductor device structure 108 for forming optical devices, as discussed with regard to FIG. 1.

Figure 4:
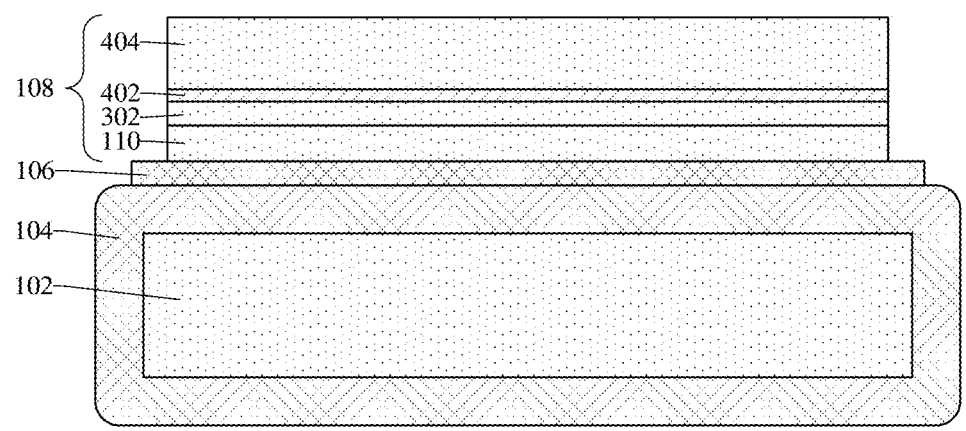
FIG. 4 illustrates a cross-sectional view of some embodiments of the SOI substrate of FIG. 3 in which the semiconductor device structure further includes an index guiding layer and a third semiconductor device layer.
Figure 5A:
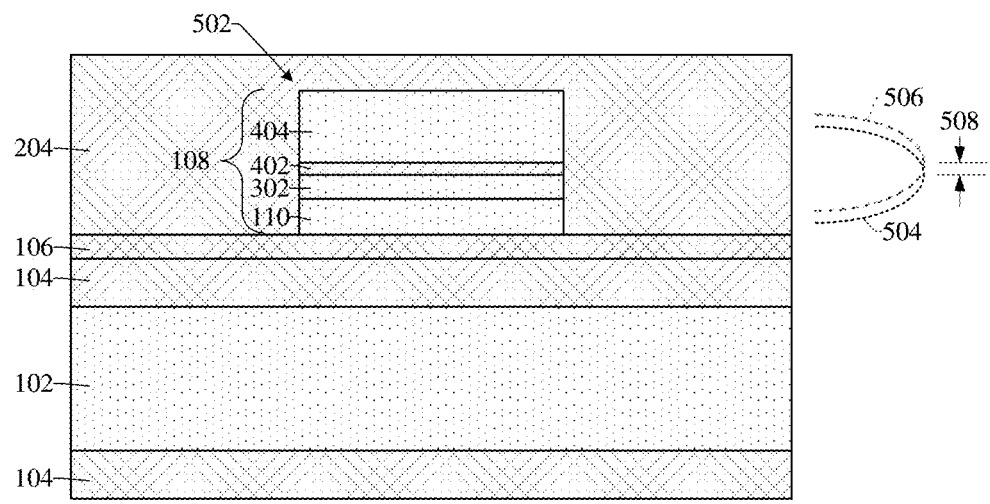
FIG. 5A illustrates a cross-sectional view of some embodiments of an optical structure formed from the SOI substrate of FIG. 4.
Figure 5B:
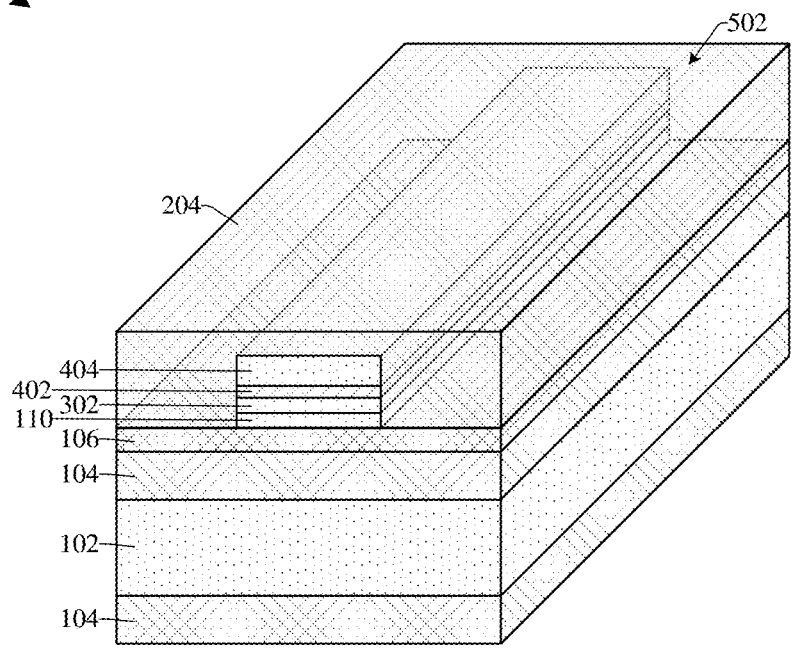
FIG. 5B illustrates a three-dimensional view of some embodiments of the optical structure of FIG. 5A.

FIG. 4 illustrates a cross-sectional view 400 of some embodiments of the SOI substrate of FIG. 3 in which the semiconductor device structure 108 further includes an index guiding layer 402 and a third semiconductor device layer 404. FIG. 5A illustrates a cross-sectional view 500a of some embodiments of an optical structure formed from the SOI substrate of FIG. 4. FIG. 5B illustrates a three-dimensional view 500b of some embodiments of the optical structure of FIG. 5A. The structure is drawn as a straight device, but some embodiments may include curves, bends or crossings.

The index guiding layer 402 is over the second semiconductor device layer 302 and the third semiconductor device layer 404 is over the index guiding layer 402. The optical structure includes a semiconductor waveguide 502. The semiconductor waveguide 502 is formed from the semiconductor device structure 108 (e.g., the first semiconductor device layer 110, the second semiconductor device layer 302, the index guiding layer 402, and the third semiconductor device layer 404).

The index guiding layer 402 comprises a semiconductor material different than the semiconductor material(s) of the semiconductor device layers 110, 302, 404. For example, the index guiding layer 402 comprises a semiconductor material having a higher refractive index than the refractive indices of the semiconductor material(s) of the semiconductor device layers 110, 302, 404. Because the refractive index of the index guiding layer 402 is greater than the refractive indices of the semiconductor device layers 110, 302, 404, an optical mode (e.g., electric field distribution) of optical radiation traveling through the semiconductor waveguide 502 (e.g., through the semiconductor device structure 108) can be vertically shifted. For example, an optical mode (e.g., illustrated by dashed line 504 of FIG. 5A) in the semiconductor waveguide 502 having the index guiding layer 402 may be vertically shifted relative to an optical mode (e.g., illustrated by dashed line 506 of FIG. 5A) in a second semiconductor waveguide (e.g., 202 of FIG. 2A and FIG. 2B) that is devoid of the index guiding layer 402. The vertical shift of the optical mode may be in the direction of the index guiding layer 402. For example, in embodiments where the index guiding layer 402 is disposed below the center of the semiconductor device structure 108, the optical mode is shifted downward (e.g., from the center of the semiconductor device structure 108) toward the index guiding layer 402 (e.g., as illustrated in FIGS. 4, 5A, 5B). Conversely, in embodiments where the index guiding layer 402 is disposed above the center of the semiconductor device structure 108, the optical mode is shifted upward toward the index guiding layer 402. Thus, the vertical position of the optical mode in the semiconductor waveguide 502 can be tuned by controlling the vertical position of the index guiding layer 402 in the semiconductor device structure 108. In some embodiments, the distance (e.g., distance 508) of the vertical shift of the optical mode may be in a range from about 1 to 10 nanometers or some other similar range.

In some instances, by tuning the vertical position of the optical mode in the semiconductor device structure 108, a performance of the semiconductor waveguide 502 formed from the semiconductor device structure 108 can be improved. For example, the optical mode can be shifted to a vertical position where a loss of optical radiation along the semiconductor waveguide 502 is minimized. Thus, a performance of the semiconductor waveguide 502 can be improved.

In some embodiments, the index guiding layer 402 may, for example, comprise silicon germanium or some other suitable material having a refractive index greater than that of the semiconductor device layers (e.g., greater than that of silicon). In some embodiments, a ratio (e.g., a molar ratio) of the silicon and the germanium in the silicon germanium index guiding layer 402 ranges from about 70% to 99% silicon and about 30% to 1% germanium.

In some embodiments, the thickness of the index guiding layer 402 is less than the thickness of the semiconductor device layers 110, 302, 404. In some embodiments, the thickness of the index guiding layer 402 is less than a critical thickness to prevent defects along the index guiding layer 402. For example, in some embodiments where the index guiding layer 402 comprises an 80% silicon and 20% germanium ratio, the critical thickness of the index guiding layer 402 is in a range from about 10 nanometers to 14 nanometers. In such embodiments, the thickness of the index guiding layer 402 is less than or equal to 14 nanometers, less than or equal to 12 nanometers, less than or equal to 10 nanometers, or some other suitable thickness. In some embodiments where the index guiding layer comprises a 96% silicon and 4% germanium ratio, the critical thickness of the index guiding layer 402 is in a range from about 85 nanometers to 95 nanometers. In such embodiments, the thickness of the index guiding layer 402 is less than or equal to 95 nanometers, less than or equal to 90 nanometers, less than or equal to 85 nanometers, or some other suitable thickness.

Although layers 102, 104, 106, 110, 302, 402, 404 are illustrated as having uniform thicknesses in FIG. 4, FIG. 5A, and FIG. 5B, it will be appreciated that said layers may have thicknesses which vary across said layers (e.g., as illustrated in FIG. 3 and/or FIG. 23).

Figure 6:
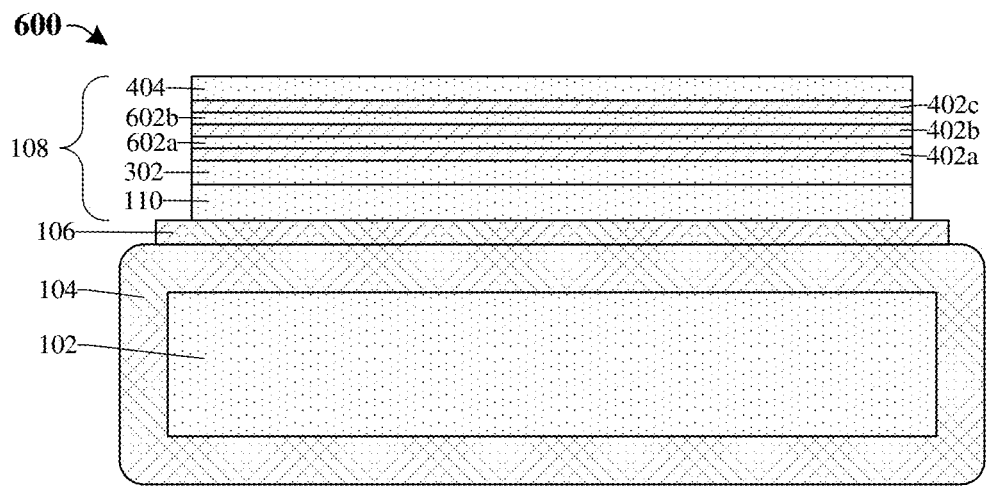
FIG. 6 and FIG. 7 illustrate cross-sectional views of some embodiments of the SOI substrate of FIG. 4 in which a plurality of index guiding layers are over the second semiconductor device layer.
Figure 7:
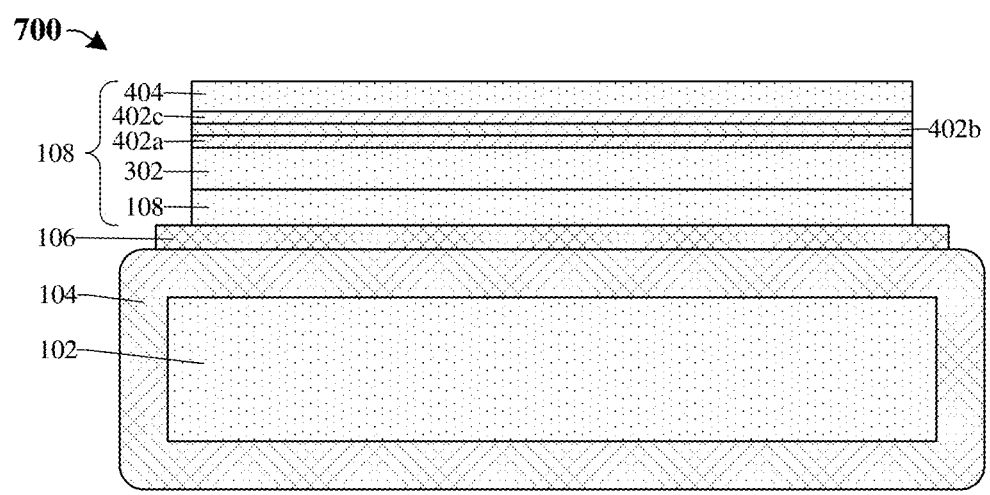

FIG. 6 and FIG. 7 illustrate cross-sectional view 600 and cross sectional view 700, respectively, of some embodiments of the SOI substrate of FIG. 4 in which a plurality of index guiding layers 402a, 402b, 402c are over the second semiconductor device layer 302.

For example, a first index guiding layer 402a is over the second semiconductor device layer 302, a second index guiding layer 402b is over the first index guiding layer 402a, and a third index guiding layer 402c is over the second index guiding layer 402b. The third semiconductor device layer 404 is over the plurality of index guiding layers 402a, 402b, 402c.

In some embodiments (e.g., as illustrated in FIG. 6), a first intermediate semiconductor layer 602a is directly between the first index guiding layer 402a and the second index guiding layer 402b. Further, a second intermediate semiconductor layer 602b is directly between the second index guiding layer 402b and the third index guiding layer 402c. In some embodiments, the intermediate semiconductor layers 602a, 602b may, for example, comprise a same semiconductor as the semiconductor device layers 110, 302, 404.

In some other embodiments (e.g., as illustrated in FIG. 7), the semiconductor device structure 108 is devoid of the intermediate semiconductor layers 602a, 602b and the index guiding layers 402a, 402b, 402c directly contact one another. For example, in some embodiments, the second index guiding layer 402b directly contacts a top surface of the first index guiding layer 402a and the third index guiding layer 402c directly contacts a top surface of the second index guiding layer 402b.

In some embodiments, one or more of the index guiding layers 402a, 402b, 402c may have a different chemical composition than the other index guiding layers 402a, 402, 402c. For example, in some embodiments, the first index guiding layer 402a and the third index guiding layer 402c comprise silicon germanium having a first ratio of silicon and germanium (e.g., 90% silicon, 10% germanium) while the second index guiding layer 402b comprise silicon germanium having a second ratio of silicon and germanium (e.g., 80% silicon, 20% germanium). In some other embodiments, each of the index guiding layers has a higher ratio of germanium than the index guiding layer below or a lower ratio of germanium than the index guiding layer below so that the ratio of germanium increases or decreases along the vertical direction. For example, the second index guiding layer 402b may have a higher ratio of germanium than the first index guiding layer 402a, and the third index guiding layer 402c may have a higher ratio of germanium than the second index guiding layer 402b. Alternatively, the second index guiding layer 402b may have a lower ratio of germanium than the first index guiding layer 402a, and the third index guiding layer 402c may have a lower ratio of germanium than the second index guiding layer 402b.

In some embodiments (e.g., embodiments in which the index guiding layers have a same germanium ratio), the thicknesses of the index guiding layers 402a, 402b, 402c are approximately equal. In some other embodiments, different index guiding layers may have different thicknesses depending on the ratios of germanium in the different index guiding layers. For example, in some embodiments, index guiding layers having a greater ratio of germanium have a smaller thickness than index guiding layers having a lesser ratio of germanium, and vice versa.

By including the plurality of index guiding layers 402a, 402b, 402c having different chemical compositions, being disposed at different vertical positions, and/or having different thicknesses, the vertical position of the optical mode in a semiconductor waveguide (e.g., 502 of FIGS. 5A, 5B) formed from the semiconductor device structure 108 can be more finely tuned. For example, the chemical compositions of the different index guiding layers, the vertical positions of the different index guiding layers, and the thicknesses of the different index guiding layers can each be controlled to finely tune the vertical position of the optical mode. As a result, a performance of the semiconductor waveguide or some other optical device formed from the semiconductor device structure 108 can be further improved.

Although the semiconductor device structure 108 is illustrated as including three index guiding layers in FIG. 6 and FIG. 7, it will be appreciated that in some other embodiments, some other number (e.g., two, four, five, etc.) of index guiding layers may alternatively be included in the semiconductor device structure 108.

Figure 8:
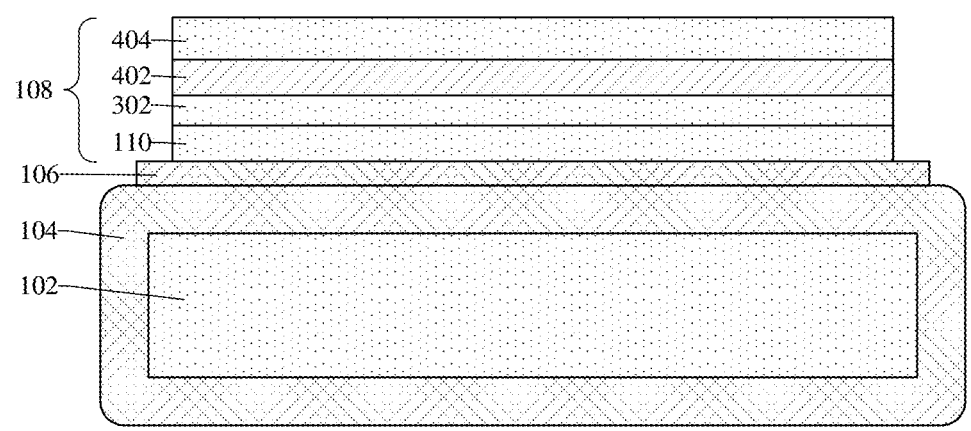
FIG. 8 illustrates a cross-sectional view of some embodiments of the SOI substrate of FIG. 4 in which the chemical composition of the index guiding layer corresponds to a gradient.

FIG. 8 illustrates a cross-sectional view 800 of some embodiments of the SOI substrate of FIG. 4 in which the chemical composition of the index guiding layer 402 corresponds to a gradient.

For example, in some embodiments, the ratio of germanium in the index guiding layer 402 may gradually change along the vertical direction. In some embodiments, the ratio of germanium in the index guiding layer 402 may gradually increase along the vertical direction (e.g., from the bottom of the index guiding layer 402 to the top of the index guiding layer). In some other embodiments, the ratio of germanium in the index guiding layer 402 may gradually decrease along the vertical direction (e.g., from the bottom of the index guiding layer 402 to the top of the index guiding layer). In some other embodiments, the ratio of germanium in the index guiding layer 402 may gradually increase from the bottom of the index guiding layer 402 to the center of the index guiding layer and may gradually decrease from the center of the index guiding layer 402 to the top of the index guiding layer 402.

The gradient may be linear or non-linear. In some embodiments, the thickness of the index guiding layer 402 of FIG. 8 may be in a range from 10 nanometers to 90 nanometers depending on the gradient of germanium in the index guiding layer 402.

Figure 9:
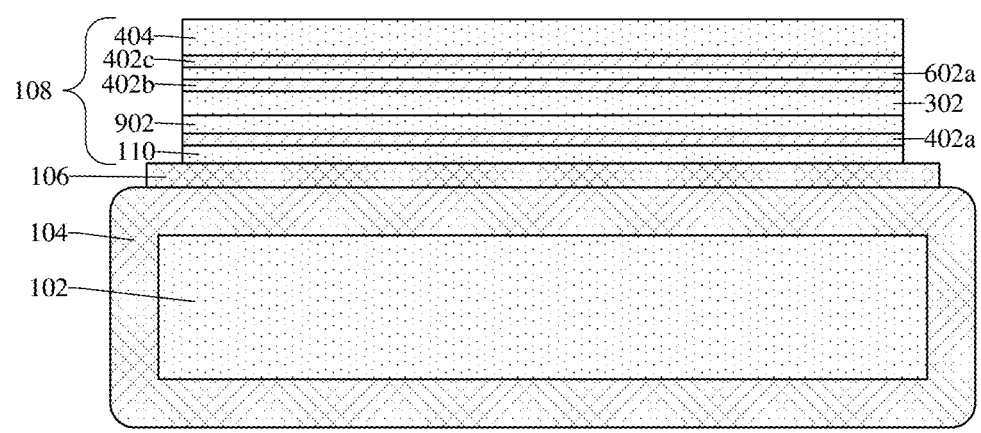
FIG. 9 illustrates a cross-sectional view of some embodiments of the SOI substrate of FIG. 4 in which one or more lower index guiding layers are disposed over the first semiconductor device layer and one or more upper index guiding layers are disposed over the second semiconductor device layer.

FIG. 9 illustrates a cross-sectional view 900 of some embodiments of the SOI substrate of FIG. 4 in which one or more lower index guiding layers are disposed over the first semiconductor device layer 110 and one or more upper index guiding layers are disposed over the second semiconductor device layer 302.

For example, in some embodiments, a first lower index guiding layer 402a is disposed over the first semiconductor device layer 110 and under the second semiconductor device layer 302, a first upper index guiding layer 402b is disposed over the second semiconductor device layer 302, and a second upper index guiding layer 402c is disposed over the second index guiding layer 402b. In some embodiments, upper intermediate semiconductor layers (e.g., 602a) are directly between the upper index guiding layers. In some embodiments in which a plurality of lower index guiding layers are disposed over the first semiconductor device layer 110 and under the second semiconductor device layer 302, lower intermediate semiconductor layers (not shown) are disposed between the lower index guiding layers.

In some embodiments, a fourth semiconductor device layer 902 is disposed over the lower index guiding layer(s). For example, the fourth semiconductor device layer 902 is disposed over the first lower index guiding layer 402a and under the second semiconductor device layer 302. In some other embodiments, the semiconductor device structure 108 is devoid of the fourth semiconductor device layer 902. Thus, the second semiconductor device layer 302 is directly on a top surface of the uppermost lower index guiding layer (e.g., directly on a top surface of the first lower index guiding layer 402a).

FIGS. 10-23 illustrate cross-sectional views 1000-2300 of some embodiments of a method for forming a semiconductor-on-insulator (SOI) substrate comprising a first dielectric layer 104 over a semiconductor base layer 102, a second dielectric layer 106 over the first dielectric layer 104, and a semiconductor device structure 108 over the second dielectric layer 106. Although FIGS. 10-23 are described in relation to a method, it will be appreciated that the structures disclosed in FIGS. 10-23 are not limited to such a method, but instead may stand alone as structures independent of the method.

Figure 10:
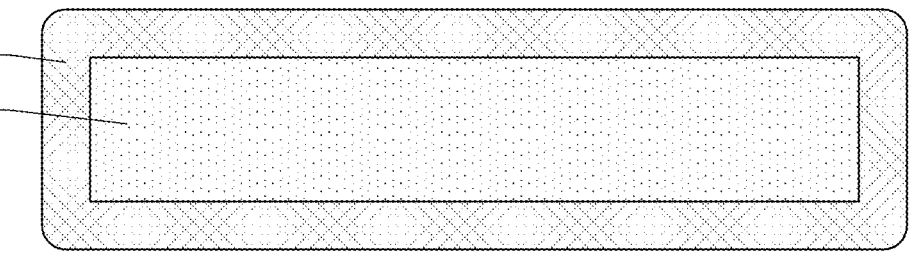
FIGS. 10-23 illustrate cross-sectional views of some embodiments of a method for forming a semiconductor-on-insulator (SOI) substrate comprising a first dielectric layer over a semiconductor base layer, a second dielectric layer over the first dielectric layer, and a semiconductor device structure over the second dielectric layer.

As shown in cross-sectional view 1000 of FIG. 10, a first dielectric layer 104 is formed on a semiconductor base layer 102. For example, in some embodiments, the first dielectric layer 104 is formed on the semiconductor base layer 102 by a thermal oxidation process or some other suitable process. In some embodiments, the semiconductor base layer 102 may, for example, comprise silicon or some other suitable material and the first dielectric layer 104 may, for example, comprise silicon dioxide or some other suitable material. In some embodiments, the semiconductor base layer 102 and the first dielectric layer 104 form a carrier wafer.

Figure 11:
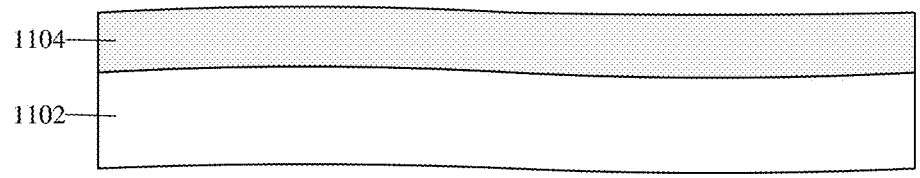

As shown in cross-sectional view 1100 of FIG. 11, a first etch stop layer (ESL) 1104 is formed on a support layer 1102. For example, in some embodiments, the first etch stop layer 1104 is formed on the support layer 1102 by an epitaxial growth process or some other suitable process. In some embodiments, the support layer 1102 and the first etch stop layer 1104 may, for example, comprise silicon or some other suitable material. In some embodiments, the silicon of the support layer 1102 and the first etch stop layer 1104 is doped and has a first doping type (e.g., p-type doping).

Figure 12:
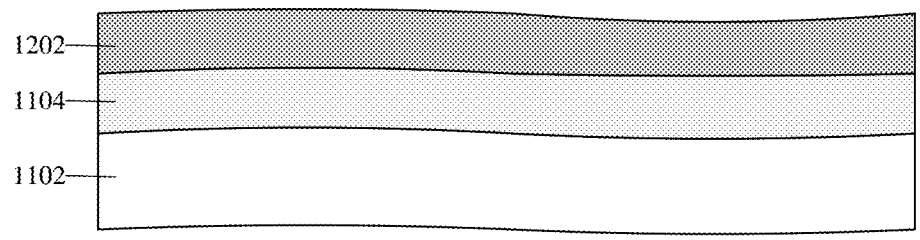

As shown in cross-sectional view 1200 of FIG. 12, a second etch stop layer 1202 is formed on the first etch stop layer 1104. For example, in some embodiments, the second etch stop layer 1202 is formed on the first etch stop layer 1104 by an epitaxial growth process or some other suitable process. In some embodiments, the second etch stop layer 1202 may, for example, comprise silicon germanium or some other suitable material.

Figure 13:
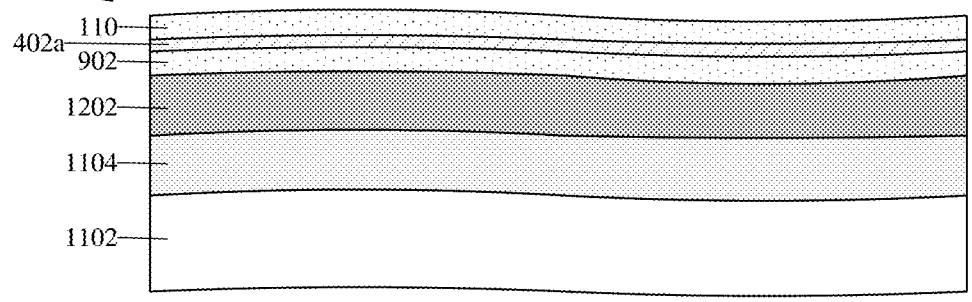

As shown in cross-sectional view 1300 of FIG. 13, one or more lower semiconductor device layers (e.g., 902, 110) and one or more lower index guiding layers (e.g., 402a) are formed over the second etch stop layer 1202. For example, in some embodiments, a fourth semiconductor device layer 902 is formed on the second etch stop layer 1202, a first lower index guiding layer 402a is formed over the fourth semiconductor device layer 902, and a first semiconductor device layer 110 is formed over the first lower index guiding layer 402a.

In some embodiments, a plurality of lower index guiding layers are formed over the fourth semiconductor device layer 902. For example, in some embodiments, a second lower index guiding layer (not shown) is formed over the first lower index guiding layer 402a and the first semiconductor device layer 110 is formed over the second lower index guiding layer (not shown). In some embodiments, lower intermediate semiconductor layers (not shown) are formed between the lower index guiding layers. For example, a lower intermediate semiconductor layer (not shown) is formed over the first lower index guiding layer 402a and the second lower index guiding layer (not shown) is formed over the intermediate semiconductor layer (not shown). In some other embodiments, the lower index guiding layers are formed directly on one another without lower intermediate semiconductor layers therebetween.

In some embodiments, the one or more lower semiconductor device layers (e.g., 902, 110) may, for example, comprise silicon or some other suitable material. In some embodiments, the one or more lower index guiding layers (e.g., 402a) may, for example, comprise silicon germanium or some other suitable material. In some embodiments, the one or more lower semiconductor device layers (e.g., 902, 110) and the one or more lower index guiding layers (e.g., 402a) are formed by a common epitaxial growth process. For example, a germanium composition of silicon germanium can be set to zero during portions of the common epitaxial growth process where silicon is intended to be formed and the germanium composition of the silicon germanium can be set to a value greater than zero during portions of the common epitaxial growth process where silicon germanium is to be formed. In some other embodiments, the one or more lower semiconductor device layers (e.g., 902, 110) and the one or more lower index guiding layers (e.g., 402a) are formed by separate epitaxial growth processes.

In some embodiments, the fourth semiconductor device layer 902 and the lower index guiding layer(s) (e.g., 402a) are not formed over the second etch stop layer 1202. Instead, in some embodiments, the first semiconductor device layer 110 is formed directly on the second etch stop layer 1202.

Figure 14:
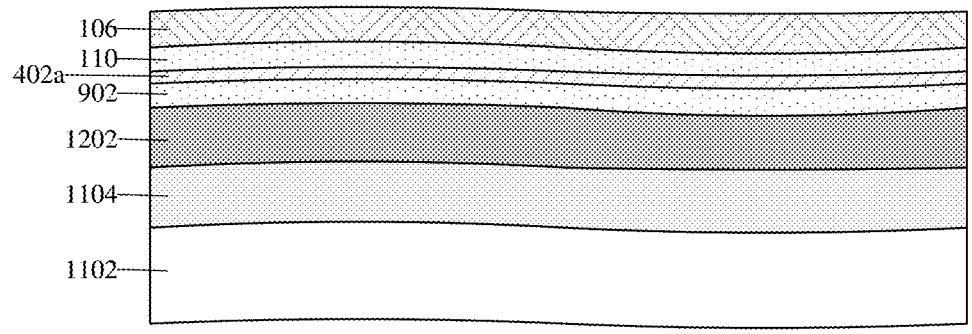

As shown in cross-sectional view 1400 of FIG. 14, a second dielectric layer 106 is formed over the first semiconductor device layer 110. For example, in some embodiments, the second dielectric layer 106 is formed over the first semiconductor device layer 110 by a chemical vapor deposition (CVD) process, a physical vapor deposition (PVD) process, an atomic layer deposition (ALD) process, or some other suitable process. In some embodiments, the second dielectric layer 106 may, for example, comprise silicon dioxide or some other suitable material. In some embodiments, the lower semiconductor device layers (e.g., 110, 902), the lower index guiding layers (e.g., 402a), and the second dielectric layer 106 form a device wafer.

Figure 15:
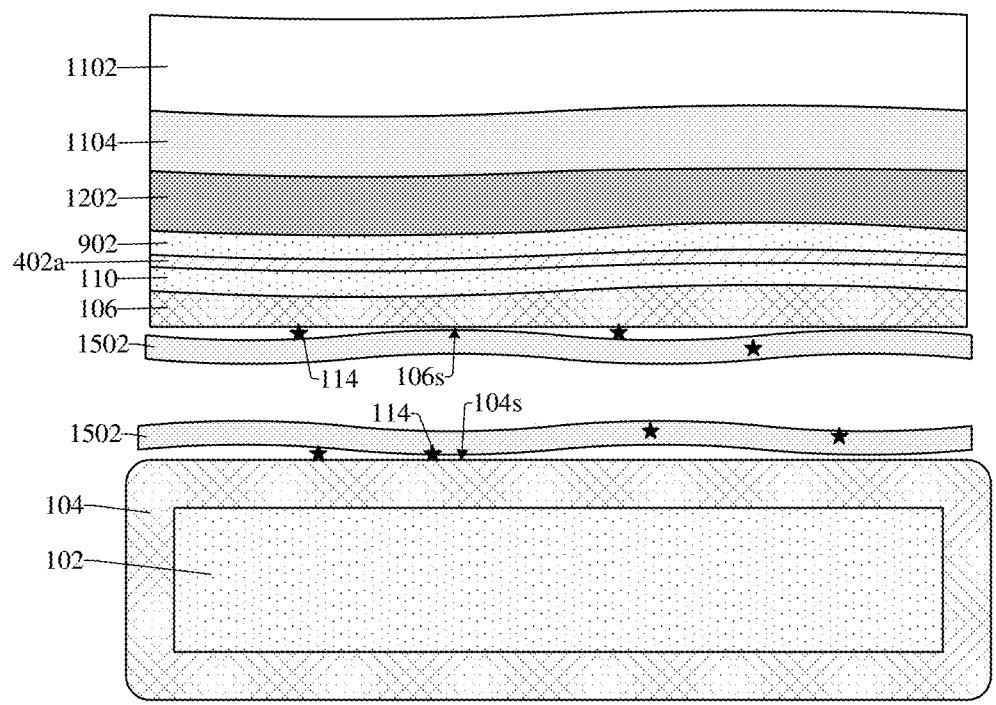

In some other embodiments, the second dielectric layer 106 is not formed over the first semiconductor device layer 110 (e.g., the SOI substrate is devoid of the second dielectric layer 106) and the method continues to FIG. 15.

As shown in cross-sectional view 1500 of FIG. 15, a cleaning process is performed on bonding surfaces of the dielectric layers 104, 106 (e.g., a first surface 104s of the first dielectric layer 104 and a first surface 106s of the second dielectric layer 106) to remove particles 114 from the bonding surfaces in preparation for bonding the dielectric layers 104, 106 together along the bonding surfaces. Performing the cleaning process includes providing a cleaning solution 1502 to the bonding surfaces of the dielectric layers 106, 106. In some embodiments, the cleaning solution 1502 comprises dilute ammonium hydroxide (e.g., NH4OH) or some other suitable solution. When the cleaning solution 1502 is brought into contact with the bonding surfaces and the particles 114 along the bonding surfaces, the cleaning solution 1502 creates negative surface charges along both the bonding surfaces and the particles 114. Thus, a repulsive electrostatic force is created between the bonding surfaces and the particles 114. Consequently, the particles 114 are repelled away from the bonding surfaces. Thus, a likelihood of the particles 114 forming defects along the bonding interface between the dielectric layers 104, 106 after bonding may be reduced.

In some embodiments, the cleaning solution 1052 is provided to the bonding surfaces 104s, 106s by spraying the cleaning solution 1502 on the bonding surfaces. In some other embodiments, the cleaning solution 1502 is provided to the bonding surfaces by submerging the bonding surfaces in the cleaning solution 1502.

In some embodiments where the SOI substrate is devoid of the second dielectric layer 106, the cleaning process is performed on the bonding surface of the first dielectric layer 104 but is not performed on the first semiconductor device layer 110.

Figure 16:
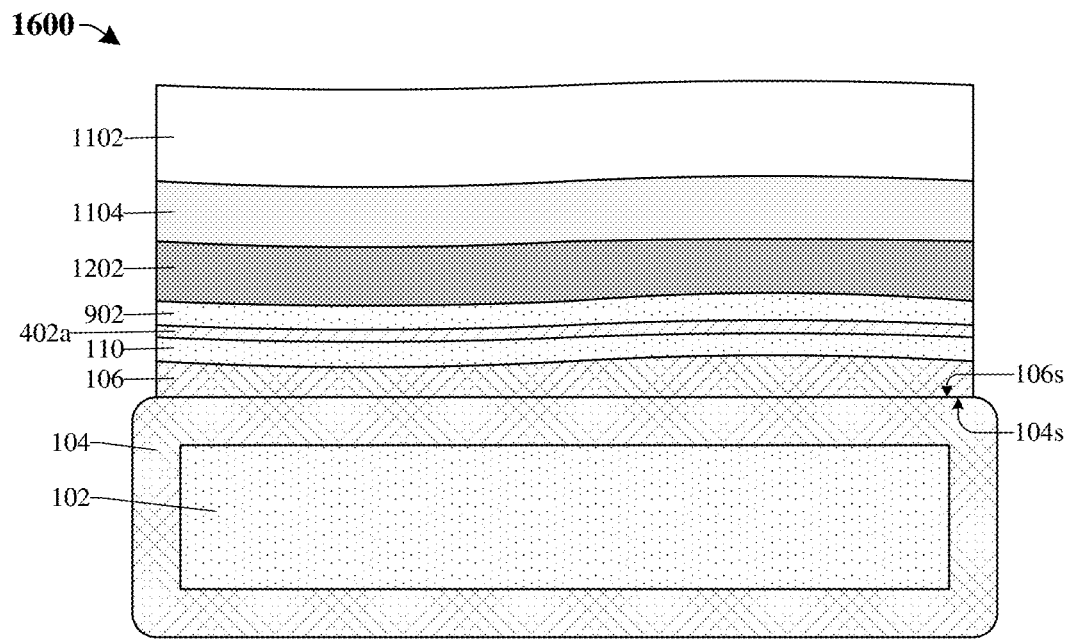

As shown in cross-sectional view 1600 of FIG. 16, the first dielectric layer 104 and the second dielectric layer 106 are bonded together along the first surface 104s of the first dielectric layer 104 and the first surface 106s of the second dielectric layer 106. The bonding is performed at a substantially low pressure. For example, the bonding is performed in an environment (e.g., a bonding chamber or the like) having a substantially low pressure (e.g., a pressure that is less than less than 50 millibars, less than 45 millibars, or some other suitable pressure). In some embodiments, the bonding comprises a fusion bonding process or some other suitable process.

In some instances, when the bonding is not performed in an environment having a substantially low pressure (e.g., when the bonding is not performed in an environment having a pressure less than that is less than 50 millibars), a plurality of cavities (e.g., 112 of FIG. 1) may be formed along the bonding interface during the bonding. The cavities may render the SOI substrate defective. However, by bonding the first dielectric layer 104 and the second dielectric layer 106 in the environment having the substantially low pressure, a likelihood of cavities forming along the bonding interface during the bonding may be reduced. For example, because less gas exists in the substantially low pressure environment, a likelihood of gas being trapped along the bonding interface during the bonding may be reduced. Thus, the likelihood of cavities forming along the bonding interface during the bonding may be reduced.

In some embodiments where the SOI substrate is devoid of the second dielectric layer 106, the first dielectric layer 104 and the first semiconductor device layer 110 are bonded together.

Figure 17:
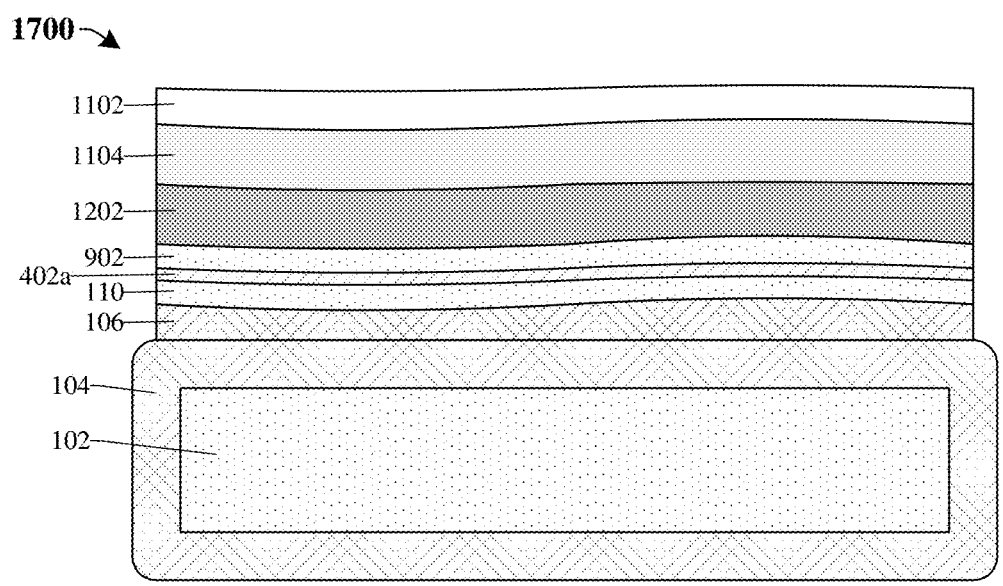

As shown in cross-sectional view 1700 of FIG. 17, the support layer 1102 is thinned. For example, in some embodiments, a grinding process is performed on the support layer 1102 to reduce the thickness of the support layer 1102. The grinding process may comprise bringing a grinding wheel into contact with the support layer 1102 to remove portions of the support layer 1102.

Further, in some embodiments, an edge trimming process is performed on the support layer 1102 and the first etch stop layer 1104 after the grinding process. The edge trimming process may comprise bringing a trim blade into contact with peripheral portions of the support layer 1102 and the first etch stop layer 1104 to remove the peripheral portions of said layers. In some embodiments, the support layer 1102 is thinned again after the edge trimming process. For example, in some embodiments, a second grinding process is performed on the support layer 1102 after the edge trimming process.

Figure 18:
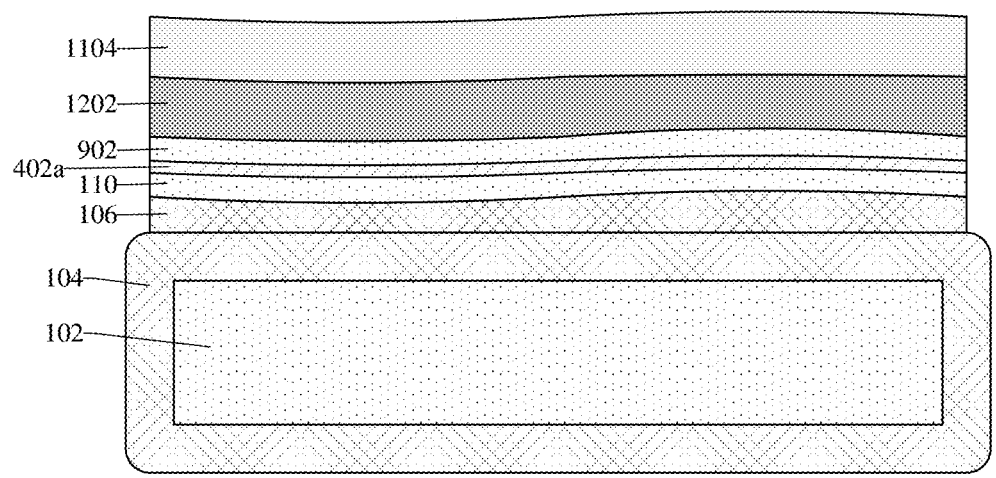

As shown in cross-sectional view 1800 of FIG. 18, the support layer 1102 is removed from over the first etch stop layer 1104. For example, in some embodiments, a first etching process is performed on the support layer 1102 to remove the support layer 1102 from over the first etch stop layer 1104. In some embodiments, the first etching process stops at a top surface of the first etch stop layer 1104. In some other embodiments, the first etching process may remove small portions of the first etch stop layer 1104. In some embodiments, the first etching process comprises a wet etching process such as, for example, an HNA (hydrofluoric acid, nitric acid, and acetic acid) etching process or some other suitable process.

Figure 19:
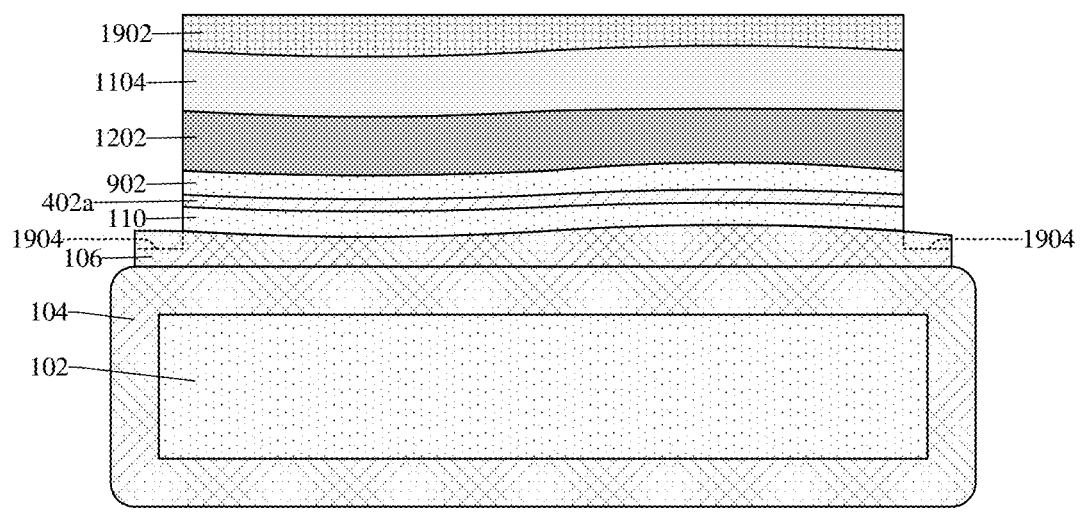

As shown in cross-sectional view 1900 of FIG. 19, the first etch stop layer 1104, the second etch stop layer 1202, the one or more lower semiconductor device layers (e.g., the fourth semiconductor device layer 902 and the first semiconductor device layer 110), and the one or more lower index guiding layers (e.g., the first lower index guiding layer 402a) are etched with a second etching process to remove peripheral portions of said layers. For example, in some embodiments, a masking layer 1902 is formed over the first etch stop layer 1104. The first etch stop layer 1104, the second etch stop layer 1202, the one or more lower semiconductor device layers, and the one or more lower index guiding layers are etched according to the masking layer 1902 to remove the peripheral portions of said layers that are uncovered by the masking layer 1902. In some embodiments, the second etching process comprises a dry etching process such as, for example, a plasma etching process, a reactive ion etching process, an ion beam etching process, or some other suitable process. The second etching process may be referred to as a wafer edge etching process.

In some embodiments, the second etching process extends partially into the second dielectric layer 106 and removes a peripheral portion of the second dielectric layer 106. In such embodiments, the second dielectric layer 106 has an upper surface along the perimeter of the second dielectric layer 106 that is below the top surface of the second dielectric layer 106 as a result of the etching (e.g., as illustrated by dashed line 1904).

Figure 20:
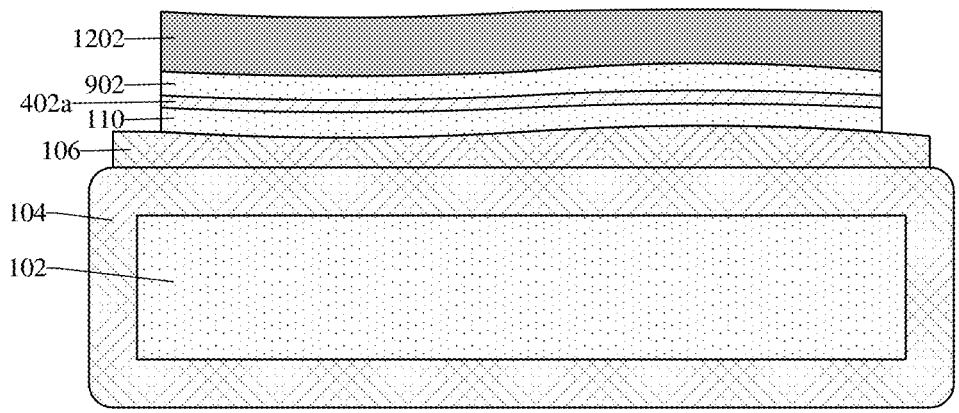

As shown in cross-sectional view 2000 of FIG. 20, the first etch stop layer 1104 is removed from over the second etch stop layer 1202. For example, in some embodiments, a third etching process and/or a planarization process is performed on the first etch stop layer 1104 to remove the first etch stop layer 1104 from over the second etch stop layer 1202. In some embodiments, the third etching process and/or the planarization process stops at the top surface of the second etch stop layer 1202. In some other embodiments, the third etching process and/or the planarization process may remove small portions of the second etch stop layer 1202. In some embodiments, the third etching process comprises a wet etching process such as, for example, a TMAH (Tetramethyl ammonium hydroxide) etching process or some other suitable process. In some embodiments, the planarization process comprises a chemical mechanical planarization (CMP) process or some other suitable process.

Figure 21:
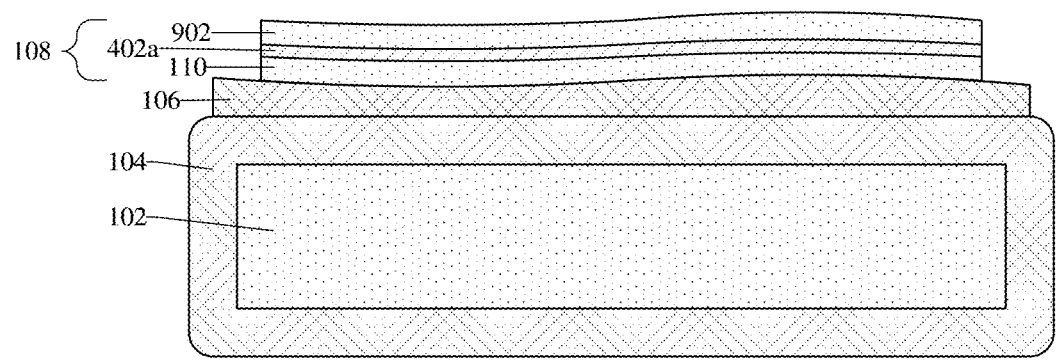

As shown in cross-sectional view 2100 of FIG. 21, the second etch stop layer 1202 is removed from over the first semiconductor device layer 110. For example, in some embodiments, a fourth etching process is performed on the second etch stop layer 1202 to remove the second etch stop layer 1202 from over the first semiconductor device layer 110. In some embodiments, the fourth etching process stops at the top surface of the uppermost lower semiconductor device layer (e.g., 902). In some other embodiments, the fourth etching process may remove small portions of the uppermost lower semiconductor device layer (e.g., 902). In some embodiments, the fourth etching process comprises a wet etching process, a dry etching process, or some other suitable process.

Figure 22:
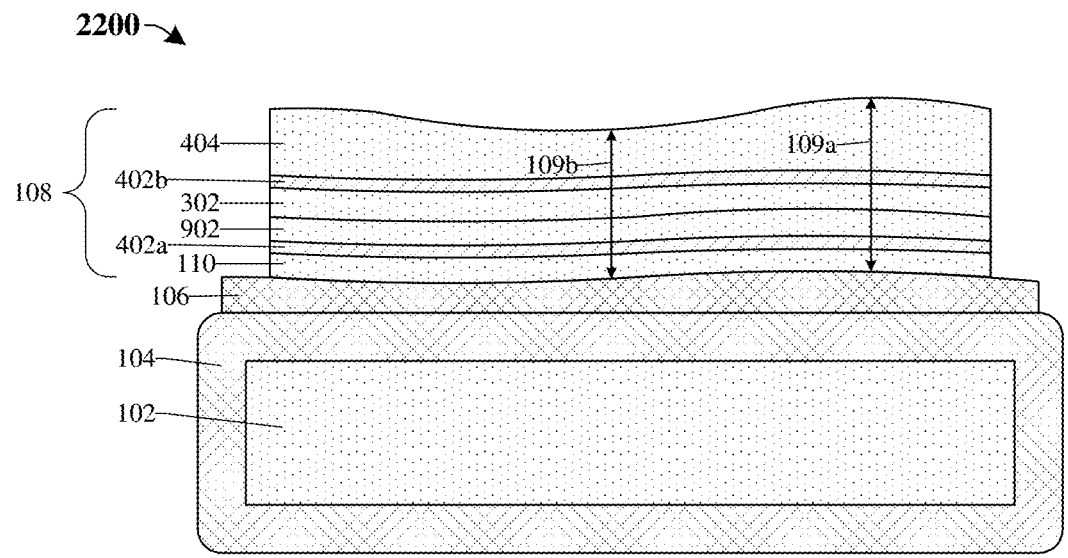

As shown in cross-sectional view 2200 of FIG. 22, one or more upper semiconductor device layers (e.g., 302, 404) and one or more upper index guiding layers (e.g., 402b) are formed over the first semiconductor device layer 110. For example, a second semiconductor device layer 302 is formed over the first semiconductor device layer 110, a first upper index guiding layer 402b is formed over the second semiconductor device layer, and a third semiconductor device layer 404 is formed over the first upper index guiding layer 402b. In some embodiments, the second semiconductor device layer 302 is formed directly on the fourth semiconductor device layer 902. In some other embodiments, the second semiconductor device layer 302 is formed directly on the first semiconductor device layer 110.

In some embodiments, the one or more upper semiconductor device layers (e.g., the second semiconductor device layer 302 and the third semiconductor device layer 404) and the one or more upper index guiding layers (e.g., the first upper index guiding layer 402b) are formed by an epitaxial growth process or some other suitable process. In some embodiments, the one or more upper semiconductor device layers and the one or more upper index guiding layer are formed by a common epitaxy process (e.g., a single epitaxy process). In some other embodiments, each of the upper semiconductor device layers and the upper index guiding layers are formed by separate epitaxy processes. In some embodiments, the one or more upper semiconductor device layers (e.g., 302, 404) may, for example, comprise silicon or some other suitable material. In some embodiments, the one or more upper index guiding layers (e.g., 402b) may, for example, comprise silicon germanium or some other suitable material.

In some embodiments in which a plurality of upper index guiding layers are formed over the second semiconductor device layer 302, upper intermediate semiconductor layers are formed directly between the upper index guiding layers (e.g., as illustrated in FIG. 6). In some other embodiments in which a plurality of upper index guiding layers are formed over the second semiconductor device layer 302, the upper index guiding layers are formed directly on one another without upper intermediate semiconductor layers therebetween (e.g., as illustrated in FIG. 7). In some embodiments, the chemical composition of the one or more upper index guiding layers (e.g., 402b) vary and/or correspond to a gradient (e.g., as discussed with regard to FIG. 8).

The semiconductor device layers (e.g., 110, 902, 302, 404) and the index guiding layers (e.g., 402a, 402b) form a semiconductor device structure 108 over the dielectric layers 104, 106. The upper semiconductor device layers (e.g., 302, 404) are formed over the lower semiconductor device layers (e.g., 110, 902) to increase the thickness of the semiconductor device structure 108 to a suitable thickness for optical devices that may be formed from the semiconductor device structure 108. In some embodiments where lower semiconductor device layers (e.g., 110, 902) are substantially thick, the upper semiconductor device layers (e.g., 302, 404) and the upper index guiding layers (e.g., 402b) may not be formed over the lower semiconductor device layers (e.g., 110, 902). The thickness of semiconductor device structure 108 (e.g., distance between a top surface of the semiconductor device structure 108 and a bottom surface of the semiconductor device structure 108) varies along the structure between a maximum thickness 109a and a minimum thickness 109b after forming the semiconductor device structure 108.

As shown in cross-sectional view 2300 of FIG. 23, a planarization process is performed on the top surface of the semiconductor device structure 108. For example, in some embodiments, the planarization is performed on the top surface of the third semiconductor device layer 404. In some other embodiments, the planarization is performed on the top surface of the second semiconductor device layer 302

(e.g., as illustrated in FIG. 3). In some other embodiments, the planarization is performed on the top surface of the fourth semiconductor device layer 902. In some other embodiments, the planarization is performed on the top surface of the first semiconductor device layer 110 (e.g., as illustrated in FIG. 1). In some embodiments, the planarization process comprises a chemical mechanical planarization (CMP) process or some other suitable process. In some embodiments, the planarization process may alternatively be referred to as a polishing process.

The planarization process reduces a maximum height of the top surface of the semiconductor device structure 108. Thus, the maximum thickness 109a of the semiconductor device structure 108 can be reduced and hence the TTV of the semiconductor device structure 108 can be reduced. In some embodiments, the planarization process is performed at least until a TTV (e.g., a difference between the maximum thickness 109a and the minimum thickness 109b) is substantially small (e.g., less than 5% of the maximum thickness 109a, less than 3% of the maximum thickness 109a, or some other suitable value).

In some instances, when the TTV of the semiconductor device structure 108 is not substantially small (e.g., when the TTV is not less than 5% of the maximum thickness 109a), the semiconductor device structure 108 may not be suitable for optical devices. For example, an optical device (e.g., a semiconductor waveguide) formed from a semiconductor device structure having a TTV that is not substantially small may suffer from substantial optical radiation loss or some other performance issues. Thus, the optical device may be rendered defective. However, by performing the planarization process on the top surface of the semiconductor device structure 108 at least until the TTV of the semiconductor device structure 108 is substantially small (e.g., less than 5% of the maximum thickness 109a, less than 3% of the maximum thickness 109a, or some other suitable value), the semiconductor device structure 108 may be more suitable for optical devices. For example, because the TTV of the semiconductor device structure 108 is substantially small after the planarization, a loss of optical radiation along an optical device (e.g., a semiconductor waveguide) formed from the semiconductor device structure 108 may be reduced.

Figure 24:
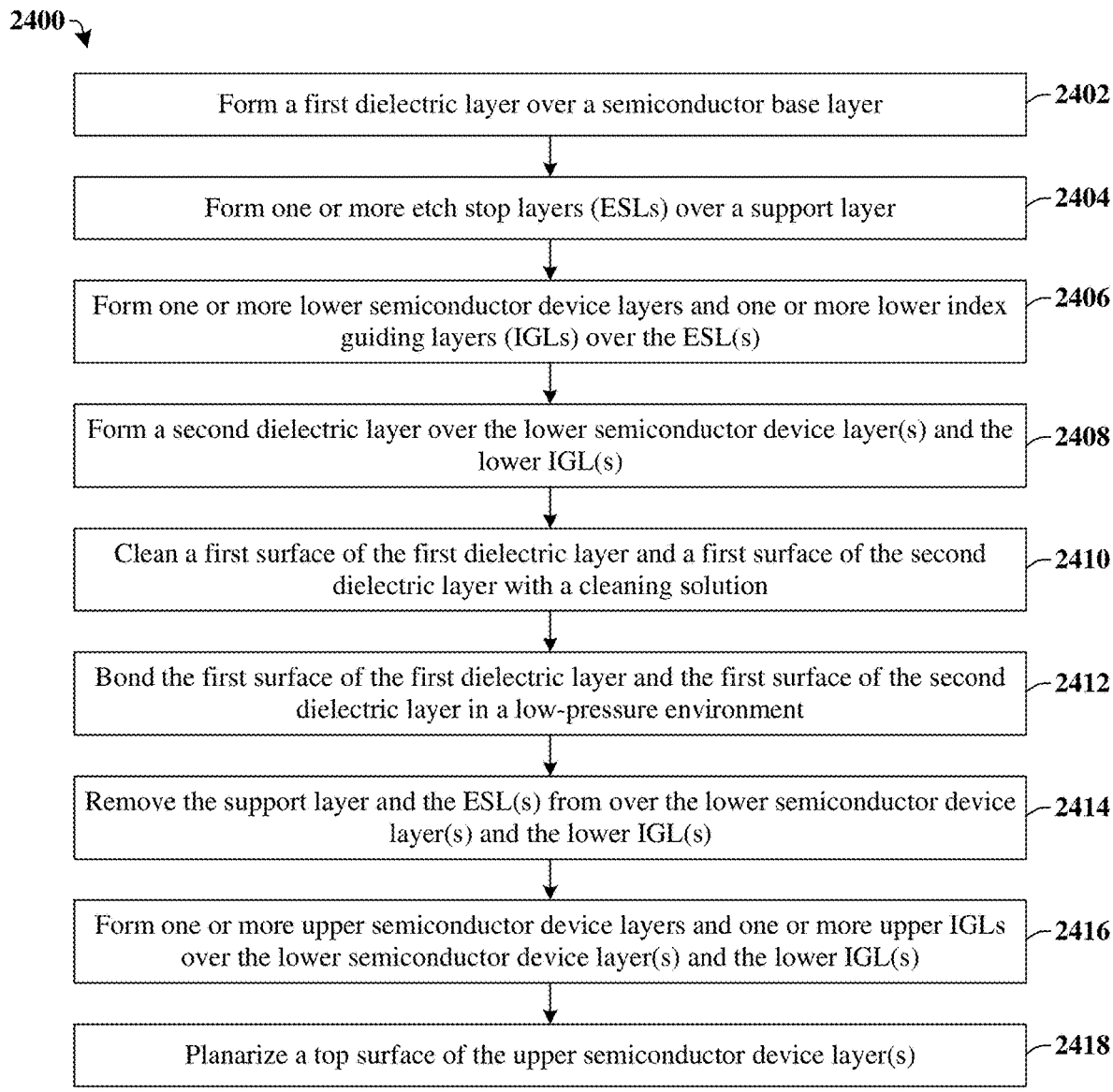
FIG. 24 illustrates a flow diagram of some embodiments of a method for forming a semiconductor-on-insulator (SOI) substrate including semiconductor device layers and index guiding layers over a semiconductor base layer.

FIG. 24 illustrates a flow diagram of some embodiments of a method 2400 for forming a semiconductor-on-insulator (SOI) substrate including semiconductor device layers and index guiding layers over a semiconductor base layer. While method 2400 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At block 2402, form a first dielectric layer over a semiconductor base layer. FIG. 10 illustrates a cross-sectional view 1000 of some embodiments corresponding to block 2402.

At block 2404, form one or more etch stop layers (ESLs) over a support layer. FIG. 11 illustrates a cross-sectional view 1100 and FIG. 12 illustrates a cross-sectional view 1200 of some embodiments corresponding to block 2404.

At block 2406, form one or more lower semiconductor device layers and one or more lower index guiding layers (IGLs) over the ESL(s). FIG. 13 illustrates a cross-sectional view 1300 of some embodiments corresponding to block 2406.

At block 2408, form a second dielectric layer over the lower semiconductor device layer(s) and the lower IGL(s). In some other embodiments, the second dielectric layer is not formed over the lower semiconductor device layer(s) and the lower IGL(s). FIG. 14 illustrates a cross-sectional view 1400 of some embodiments corresponding to block 2408.

At block 2410, clean a first surface of the first dielectric layer and a first surface of the second dielectric layer with a cleaning solution. FIG. 15 illustrates a cross-sectional view 1500 of some embodiments corresponding to block 2410.

At block 2412, bond the first surface of the first dielectric layer and the first surface of the second dielectric layer in a low-pressure environment. FIG. 16 illustrates a cross-sectional view 1600 of some embodiments corresponding to block 2412.

At block 2414, remove the support layer and the ESL(s) from over the lower semiconductor device layer(s) and the lower IGL(s). FIGS. 17-21 illustrate cross-sectional views 1700-2100 of some embodiments corresponding to block 2414.

At block 2416, form one or more upper semiconductor device layers and one or more upper IGLs over the lower semiconductor device layer(s) and the lower IGL(s). FIG. 22 illustrates a cross-sectional view 2200 of some embodiments corresponding to block 2416.

At block 2418, planarize a top surface of the upper semiconductor device layer(s). FIG. 23 illustrates a cross-sectional view 2300 of some embodiments corresponding to block 2418.

Accordingly, in some embodiments, the present disclosure relates to a method for forming a semiconductor-on-insulator (SOI) structure. The method includes forming a first dielectric layer on a first semiconductor layer. A second semiconductor layer is formed over an etch stop layer (ESL). A cleaning solution is provided to a first surface of the first dielectric layer. The first dielectric layer is bonded under the second semiconductor layer in an environment having a substantially low pressure. The ESL is removed from over the second semiconductor layer. A third semiconductor layer is formed over the second semiconductor layer. A distance between a top of the third semiconductor layer and a bottom of the second semiconductor layer varies between a maximum distance and a minimum distance, different than the maximum distance. A planarization process is performed on the third semiconductor layer to reduce the maximum distance between the top of the third semiconductor layer and the bottom of the second semiconductor layer.

In other embodiments, the present disclosure relates to a method for forming a semiconductor-on-insulator (SOI) structure. The method includes forming a first dielectric layer on a semiconductor base layer. A first semiconductor device layer including a first semiconductor material is formed over an etch stop layer (ESL). A second dielectric layer is formed over the first semiconductor device layer. A cleaning solution is provided to a first surface of the first dielectric layer and a first surface of the second dielectric layer to remove particles from the first surface of the first dielectric layer and the first surface of the second dielectric layer. The first surface of the first dielectric layer and the first surface of the second dielectric layer are bonded in an environment having a substantially low pressure. The ESL from is removed over the first semiconductor device layer. A first index guiding layer including a second semiconductor material, different from the first semiconductor material, is formed over the first semiconductor device layer. A second semiconductor device layer including a third semiconductor material, different from the second semiconductor material, is formed over the first index guiding layer. A distance between a top of the second semiconductor device layer and a bottom of the first semiconductor device layer varies between a maximum distance and a minimum distance, different than the maximum distance, along the second semiconductor device layer. A planarization process is performed on the second semiconductor device layer to reduce the maximum distance between the top of the second semiconductor device layer and the bottom of the first semiconductor device layer.

In yet other embodiments, the present disclosure relates to a semiconductor-on-insulator (SOI) structure including a semiconductor base layer and a first dielectric layer over the semiconductor base layer. A second dielectric layer is over the first dielectric layer. A semiconductor device structure is over the second dielectric layer. The semiconductor device structure includes a first semiconductor device layer and a second semiconductor device layer over the first semiconductor device layer. A thickness of the semiconductor device structure varies between a maximum thickness and a minimum thickness, different than the maximum thickness. A difference the maximum thickness and the minimum thickness is less than 5% of the maximum thickness.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming a semiconductor-on-insulator (SOI) structure, the method comprising:
   forming a first dielectric layer on a first semiconductor layer;
   forming a second semiconductor layer over an etch stop layer (ESL);
   providing a cleaning solution to a first surface of the first dielectric layer;
   bonding the first dielectric layer under the second semiconductor layer in an environment having a substantially low pressure;
   removing the ESL from over the second semiconductor layer;
   forming a third semiconductor layer over the second semiconductor layer, wherein a distance between a top of the third semiconductor layer and a bottom of the second semiconductor layer varies between a maximum distance and a minimum distance, different than the maximum distance; and
   performing a planarization process on the third semiconductor layer to reduce the maximum distance between the top of the third semiconductor layer and the bottom of the second semiconductor layer.

2. The method of claim 1, wherein the planarization process is performed at least until a difference between the maximum distance and the minimum distance is less than 5% of the maximum distance.

3. The method of claim 1, further comprising:
   forming a second dielectric layer over the second semiconductor layer before the bonding; and
   providing the cleaning solution to a first surface of the second dielectric layer,
   wherein the cleaning solution comprises dilute ammonium hydroxide, wherein the cleaning solution removes particles from the first surface of the first dielectric layer and the first surface of the second dielectric layer before the bonding, and wherein the bonding comprises bonding the first surface of the first dielectric layer and the first surface of the second dielectric layer in the environment having the substantially low pressure.

4. The method of claim 1, wherein the substantially low pressure is less than 50 millibar.

5. The method of claim 1, further comprising:
   forming a fourth semiconductor layer over the second semiconductor layer before the forming of the third semiconductor layer over the second semiconductor layer, wherein the third semiconductor layer is formed over the fourth semiconductor layer, and wherein the fourth semiconductor layer comprises a different semiconductor than the second semiconductor layer and the third semiconductor layer.

6. The method of claim 5, further comprising:
   forming a fifth semiconductor layer over the second semiconductor layer before the forming of the fourth semiconductor layer over the second semiconductor layer, wherein the fourth semiconductor layer is formed over the fifth semiconductor layer, and wherein the fifth semiconductor layer comprises a different semiconductor than the fourth semiconductor layer.

7. The method of claim 6, further comprising:
   forming a sixth semiconductor layer over the fourth semiconductor layer before the forming of the third semiconductor layer over the fourth semiconductor layer, wherein the third semiconductor layer is formed over the sixth semiconductor layer, and wherein the sixth semiconductor layer comprises a different semiconductor than the second semiconductor layer, the third semiconductor layer, and the fifth semiconductor layer.

8. The method of claim 7, wherein the fourth semiconductor layer and the sixth semiconductor layer comprise silicon germanium, and wherein the sixth semiconductor layer has a different germanium composition than the fourth semiconductor layer.

9. The method of claim 8, wherein the sixth semiconductor layer has a different thickness than the fourth semiconductor layer.

10. The method of claim 1, further comprising:
    forming a fourth semiconductor layer over the second semiconductor layer before the bonding, wherein the fourth semiconductor layer comprises a different semiconductor than the second semiconductor layer and the third semiconductor layer.

11. A method for forming a semiconductor-on-insulator (SOI) structure, the method comprising:
    forming a first dielectric layer on a semiconductor base layer;
    forming a first semiconductor device layer comprising a first semiconductor material over an etch stop layer (ESL);
    forming a second dielectric layer over the first semiconductor device layer;

providing a cleaning solution to a first surface of the first dielectric layer and a first surface of the second dielectric layer to remove particles from the first surface of the first dielectric layer and the first surface of the second dielectric layer;

bonding the first surface of the first dielectric layer and the first surface of the second dielectric layer in an environment having a substantially low pressure;

removing the ESL from over the first semiconductor device layer;

forming a first index guiding layer comprising a second semiconductor material, different from the first semiconductor material, over the first semiconductor device layer;

forming a second semiconductor device layer comprising a third semiconductor material, different from the second semiconductor material, over the first index guiding layer, wherein a distance between a top of the second semiconductor device layer and a bottom of the first semiconductor device layer varies between a maximum distance and a minimum distance, different than the maximum distance, along the second semiconductor device layer; and performing a planarization process on the second semiconductor device layer to reduce the maximum distance between the top of the second semiconductor device layer and the bottom of the first semiconductor device layer.

12. The method of claim 11, further comprising:
forming a second index guiding layer comprising the second semiconductor material over the first index guiding layer.

13. The method of claim 12, wherein the second index guiding layer is formed directly on the first index guiding layer.

14. The method of claim 12, further comprising:
forming an intermediate semiconductor layer over the first index guiding layer, wherein the second index guiding layer is formed over the intermediate semiconductor layer.

15. The method of claim 11, wherein the second semiconductor material has a greater refractive index than the first semiconductor material and the third semiconductor material.

16. The method of claim 11, wherein the second semiconductor device layer and the first index guiding layer are formed with a common epitaxy process.

17. A semiconductor-on-insulator (SOI) structure comprising:
a semiconductor base layer;
a first dielectric layer over the semiconductor base layer;
a second dielectric layer over the first dielectric layer; and
a semiconductor device structure over the second dielectric layer, the semiconductor device structure comprising a first semiconductor device layer and a second semiconductor device layer over the first semiconductor device layer, wherein a thickness of the semiconductor device structure varies between a maximum thickness and a minimum thickness, different than the maximum thickness, and wherein a difference the maximum thickness and the minimum thickness is less than 5% of the maximum thickness.

18. The SOI structure of claim 17, wherein the semiconductor device structure further comprises a first index guiding layer and a third semiconductor device layer, wherein the first index guiding layer is disposed directly between the first semiconductor device layer and the second semiconductor device layer, wherein the third semiconductor device layer is disposed directly between the first index guiding layer and the second semiconductor device layer, and wherein the first index guiding layer comprises a different semiconductor than the first semiconductor device layer, the second semiconductor device layer, and the third semiconductor device layer.

19. The SOI structure of claim 18, wherein the semiconductor device structure further comprises a second index guiding layer directly between the third semiconductor device layer and the second semiconductor device layer.

20. The SOI structure of claim 18, wherein a refractive index of the first index guiding layer is greater than refractive indices of the first semiconductor device layer, the second semiconductor device layer, and the third semiconductor device layer.

* * * * *